United States Patent [19]
Dulac

[11] Patent Number: 6,021,808
[45] Date of Patent: Feb. 8, 2000

[54] FLUID SUPPLY SHUT OFF VALVE SYSTEM AND FLUID MONITORING DEVICE FOR USE WITH SAME

[76] Inventor: Lawrence M. Dulac, 173 Portsmouth Ave., Manchester, N.H. 03109

[21] Appl. No.: 09/055,838

[22] Filed: Apr. 6, 1998

Related U.S. Application Data

[60] Provisional application No. 60/072,010, Jan. 21, 1998.

[51] Int. Cl.⁷ ................................................. F16K 31/12
[52] U.S. Cl. ........................ 137/487; 137/599; 251/297; 251/331
[58] Field of Search .................................... 137/487, 488, 137/489.5, 599; 251/331, 297

[56] References Cited

U.S. PATENT DOCUMENTS

| | | | |
|---|---|---|---|
| 2,868,492 | 1/1959 | Volcov et al. | |
| 2,921,597 | 1/1960 | Parr. | |
| 3,078,066 | 2/1963 | Moore | 251/331 X |
| 3,768,497 | 10/1973 | Mueller | 137/38 |
| 4,000,754 | 1/1977 | Risk | 137/487 |
| 4,305,420 | 12/1981 | Nussdorf | 137/312 |
| 4,691,726 | 9/1987 | Studer et al. | 137/15 |
| 4,909,274 | 3/1990 | Rodriguez | 137/312 |
| 5,007,364 | 4/1991 | Buckle | 114/331 |
| 5,024,254 | 6/1991 | Yamagiwa | 137/219 |
| 5,060,630 | 10/1991 | Boals | 126/362 |
| 5,117,863 | 6/1992 | McGarrah | 137/559 |
| 5,143,258 | 9/1992 | Mittermaier | 137/599 X |
| 5,169,291 | 12/1992 | Zebuhr | 417/41 |
| 5,240,022 | 8/1993 | Franklin | 137/1 |
| 5,301,919 | 4/1994 | May | 251/30.02 |
| 5,421,365 | 6/1995 | Matsuo et al. | 137/599 |
| 5,425,396 | 6/1995 | Wodeslavsky | 137/488 |
| 5,439,028 | 8/1995 | Meyer et al. | 137/556 |
| 5,738,333 | 4/1998 | Cognevich et al. | 137/489.5 |

FOREIGN PATENT DOCUMENTS

| | | | |
|---|---|---|---|
| 1417399 | 12/1975 | United Kingdom | 251/297 |

*Primary Examiner*—Denise L. Ferensic
*Assistant Examiner*—Ramyar Farid
*Attorney, Agent, or Firm*—Bourque & Associates, P.A.

[57] ABSTRACT

A water supply shut off valve system is used with a fluid storage tank, such as a hot water heater, to automatically shut off a fluid supply to the storage tank as a result of a pressure drop in the storage tank caused, for example, by a leak or rupture. A fluid supply shut off valve system comprises a shut off valve, such as a normally closed diaphragm valve, coupled to a supply inlet, for controlling the supply of fluid through the supply line to the storage tank. The shut off valve system further comprises a fluid monitoring device (FMD) fluidly coupled to the supply line and to the shut off valve, for monitoring the tank pressure and causing the shut off valve to remain closed when the tank pressure drops to ambient pressure. The FMD generally includes a body portion having a passageway and an actuation mechanism disposed in the passageway for opening and closing a fluid path through the FMD. When the actuation mechanism is in the normally open position, pressure is relieved from the shut off valve through the fluid path, allowing the valve to open and close. When the actuation mechanism is in the closed position as a result of a pressure drop, the shut off valve will remain closed.

22 Claims, 8 Drawing Sheets

FLUID SUPPLY SHUT OFF VALVE SYSTEM AND FLUID MONITORING DEVICE FOR USE WITH SAME

RELATED APPLICATIONS

This application claims the benefit of U.S. Provisional Patent Application Ser. No. 60/072,010 filed Jan. 21, 1998, fully incorporated herein by reference.

FIELD OF THE INVENTION

The present invention relates to a fluid supply shut off valve system used to shut off the supply of fluid to a storage tank when a leak is detected in the storage tank and more particularly, to a water supply shut off valve system including a fluid monitoring device that responds to a pressure drop in a hot water heater tank when a leak occurs and shuts off the water supply to the hot water heater tank.

BACKGROUND OF THE INVENTION

Hot water heaters are commonly used to supply hot water to household users. In general, a hot water tank is connected to a pressurized water source. The water in the storage tank is heated by a source of energy, such as natural gas or electricity. When a user opens a faucet or fixture, the hot water is drawn from the tank into the system and cold water is supplied to the hot water tank.

Hot water heaters typically operate with little or no maintenance. However, the water stored in a water heater can corrode and weaken the structure of the storage tank causing a leak or rupture. Excessive pressure in the storage tank caused by extreme water temperature can also cause a rupture.

To minimize damage from water leakage, different types of shut off valves have been used to prevent the supply of water to the storage tank after the rupture occurs. Some of these devices are actuated by a leak detector provided below the water heater to detect the fluid that has leaked. Other shut off valves are actuated by the drop in pressure of the water in the storage tank of the hot water heater when a leak or rupture occurs. One such device is disclosed in U.S. Pat. No. 5,060,630 issued to Boals and incorporated herein by reference. The automatic shut off valve disclosed in this patent uses a diaphragm valve to control the supply of fluid to the storage tank of the hot water heater. When a leak or rupture occurs, the pressure from the storage tank drops to ambient pressure, causing the diaphragm to remain close and prevent the supply of water to the storage tank.

In this and other systems that rely upon a drop in water pressure to actuate the shut off valve, a false shut-off of the valve often occurs accidentally when no leakage has occurred. A false shut-off can occur with other pressure fluctuations in the storage tank that are not caused by a leak or rupture. For example, excessive drawing of cold water on the inlet side of the hot water tank during ordinary use could possibly cause a sufficient pressure drop in the supply line to actuate the automatic shut off valve, thereby causing the automatic shut off valve to lock up and prevent the supply of water to the hot water tank.

Accordingly, a need exists for an automatic fluid supply shut off valve system that is actuated by a pressure drop in a storage tank, such as a hot water heater, without accidentally locking up when pressure fluctuations occur as a result of drawing fluid from the storage tank during ordinary use. A need also exists for a fluid monitoring device for use in a fluid supply shut off valve system to prevent unwanted false shut downs.

SUMMARY OF THE INVENTION

The present invention features a fluid supply shut off valve system, for use with a fluid storage tank fluidly coupled to a supply inlet, for supplying fluid to the fluid storage tank, and fluidly coupled to a system outlet, for drawing fluid from the fluid storage tank. The system comprises a shut off valve, such as a diaphragm valve, coupled to the supply inlet, for controlling the supply of fluid through the supply inlet to the storage tank. The shut off valve is in a normally closed position and opens to supply fluid to the storage tank as fluid is drawn through the system outlet. The system also comprises a fluid monitoring device (FMD) fluidly coupled to the shut off valve, the supply inlet, and the supply outlet. The FMD monitors pressure in the storage tank and causes the shut off valve to remain closed when the pressure in the storage tank drops to a predetermined pressure.

The preferred embodiment of the shut off valve includes an inlet chamber and an outlet chamber fluidly coupled to the supply inlet. A diaphragm valve member, in a normally closed position, prevents flow of fluid from the inlet chamber to the outlet chamber and in an open position, allows fluid to flow from the inlet chamber to the outlet chamber. A pressure chamber is formed on one side of the diaphragm valve member opposite the inlet and outlet chambers. The FMD is fluidly coupled to the pressure chamber for relieving pressure from the pressure chamber and allowing the diaphragm valve member to move to the open position. When the FMD detects a drop in pressure in the storage tank, the FMD will prevent pressure relief from the pressure chamber and will thereby prevent the diaphragm valve member from moving to the open position.

The present invention also features a fluid monitoring device including a body portion having a central passageway and an actuation mechanism disposed within the central passageway. A supply pressure sensor line is fluidly coupled to the body portion, for detecting a supply pressure in the supply inlet. A tank pressure sensor line is fluidly coupled to the body portion, for detecting a tank pressure in the storage tank. The actuation mechanism is responsive to the supply pressure detected by the supply pressure sensor line and the tank pressure detected by the tank pressure sensor line, for preventing the shut off valve from opening and supplying fluid to the fluid storage tank in response to a predetermined pressure differential.

According to the preferred embodiment of the FMD, the body portion includes an inlet passageway, for fluidly coupling the central passageway to the shut off valve, and an outlet passageway, for fluidly coupling the central passageway to an outlet. The actuation mechanism opens and closes a fluid path through the inlet passageway, the central passageway, and the outlet passageway. The fluid path relieves pressure from the shut off valve, allowing the shut off valve to open when the actuation mechanism is in an open position and preventing the shut off valve from opening when the actuation mechanism is in a closed position. The fluid passageway is preferably disposed proximate an end of the central passageway coupled to the supply pressure sensor line such that fluid from the supply pressure sensor line enters the pressure chamber in the diaphragm valve through the inlet passageway to maintain pressure on the diaphragm valve when the actuation mechanism is in a closed position.

The preferred embodiment of the actuation mechanism includes a plunger slidably disposed in the central passageway, for opening and closing the fluid path through the central passageway, and a biasing element, for biasing the plunger toward an open position in which the fluid path through the central passageway is open. A diaphragm is preferably disposed within the central passageway generally abutting the plunger, and a locking mechanism is preferably disposed within the central passageway of the body portion generally between the diaphragm and the biasing element, for causing the diaphragm to move the plunger toward the open position and for locking the plunger in the open position.

The present also features a locking mechanism that prevents false shut downs in a valve system including: a hollow member having an internal surface and at least one locking groove disposed within at least a portion of the internal surface; a spacer plug slidably disposed within the hollow member; a retainer plug slidably disposed within the hollow member against the spacer plug; at least one locking ball disposed between the spacer plug and the retainer plug. The retainer plug moves and retains the locking ball(s) in the locking groove(s) within the internal surface of the locking member, thereby locking the spacer plug in a locked position. A predetermined force against the spacer plug will cause the spacer plug to move the locking ball(s) out of the locking groove(s).

According to one embodiment, the shut off valve system includes an upper body portion and a lower body portion. The upper body portion includes the central passageway, inlet passageway, outlet passageway, pressure chamber are disposed in the upper body portion. The inlet chamber and outlet chamber is disposed in the lower body portion, and the diaphragm valve member is disposed between the upper and lower chambers. The supply pressure sensor line and tank pressure sensor lines extend from the central passageway in the upper body portion to the respective inlet and outlet chambers in the lower body portion.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
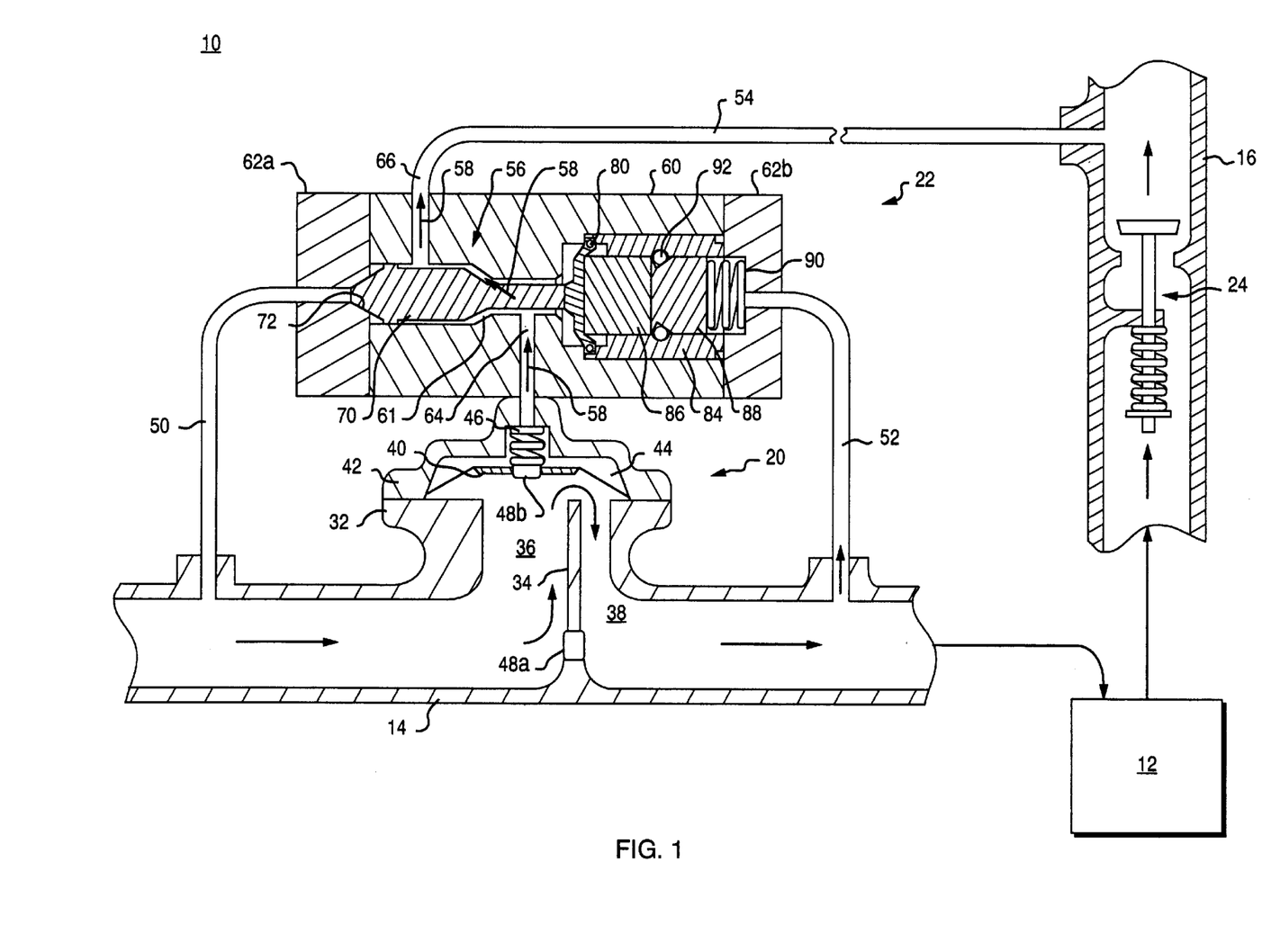
FIG. 1 is a schematic cross-sectional view of a fluid supply shut off valve system, according to the present invention, in an opened position.
Figure 2:
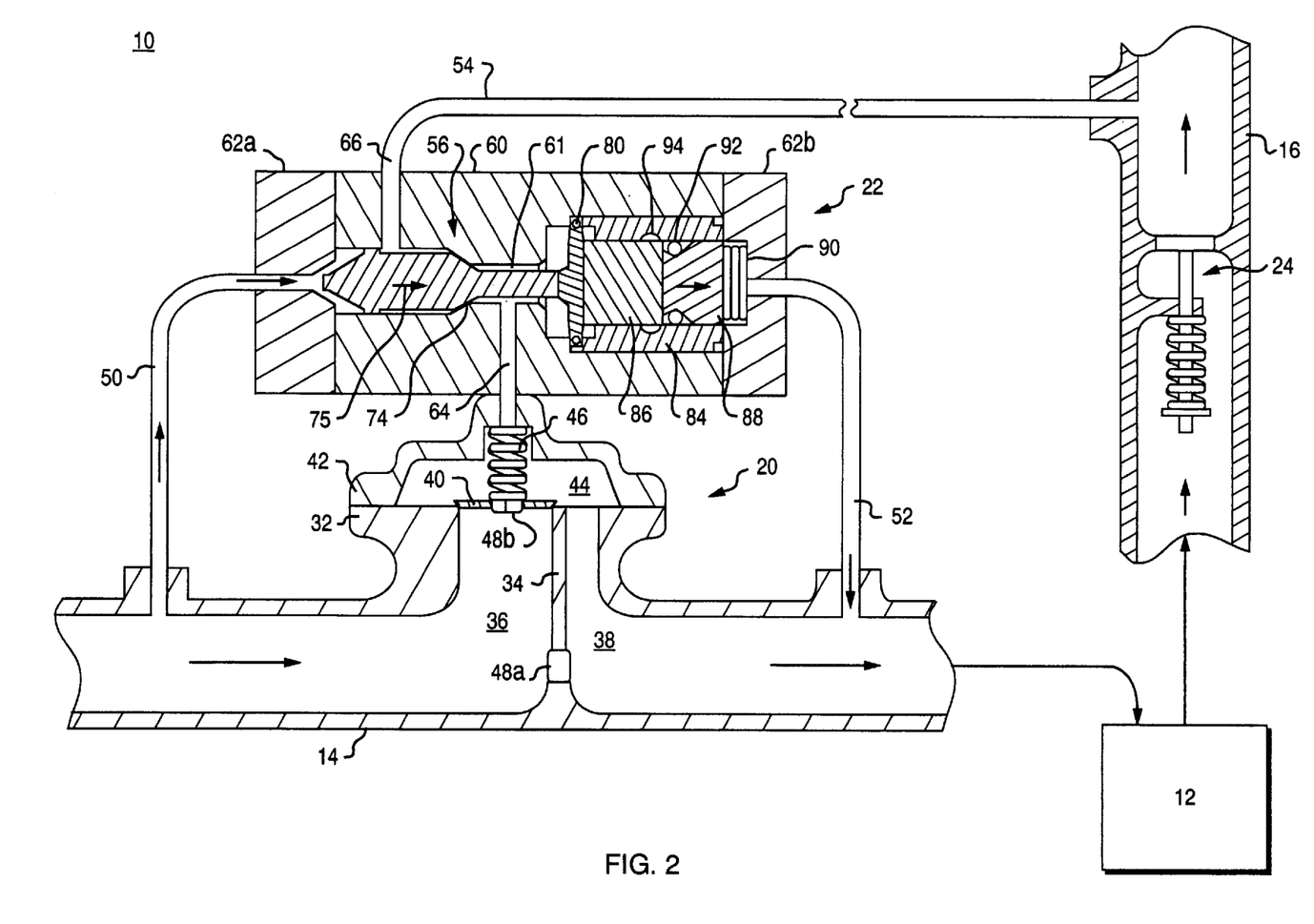
FIG. 2 is a schematic cross-sectional view of the fluid supply shut off valve system, according to the present invention, in a closed or shut off position.

A fluid supply shut off valve system 10, FIGS. 1 and 2, according to the present invention, is used to control the supply of fluid, such as water, to a storage tank 12, such as a hot water heater tank. The fluid is supplied to the storage tank 12 through a supply inlet 14 and is delivered to a user by way of a system outlet 16. A check valve 24 is disposed within the system outlet 16 that opens when the water is drawn from the tank 12. In the exemplary embodiment where the storage tank 12 is a water heater tank, the supply inlet 14 and system outlet 16 are conventional pipes used to conduct water, and the water is drawn by a user, for example, using a faucet or fixture (not shown). Although the exemplary embodiment discloses a fluid supply shut off valve system 10 used with a hot water tank and a water supply and delivery system, the present invention contemplates using the fluid supply shut off valve system with any type of liquid or gas stored in any type of pressurized vessel such as, for example, a liquid propane storage tank.

The fluid supply shut off valve system 10 generally includes a shut off valve 20 fluidly coupled to the supply inlet 14 and a fluid monitoring device (FMD) 22 fluidly coupled to the shut off valve 20, to the supply inlet 14 on both sides of the shut off valve 20, and to the system outlet 16. The shut off valve 20 controls fluid flow through the supply inlet 14 to the tank 12 and the FMD 22 controls the actuation of the shut off valve 20. In particular, the FMD 22 allows the shut off valve 20 to open (FIG. 1) during normal use such that water is supplied to the tank 12 as water is drawn from the tank 12 through the system outlet 16. The FMD 22 causes the shut off valve 20 to remain closed (FIG. 2) in response to a pressure drop in the tank 12, e.g., as a result of a leak, to prevent the supply of water through the supply inlet 14 to the tank 12, as will be described in greater detail below.

The exemplary embodiment of the shut off valve 20 includes a valve lower body portion 32 that is coupled to or integral with the supply inlet 14. A wall 34 extends within the supply inlet 14 and into the valve lower body portion 32, forming an inlet chamber 36 on one side of the wall 34 and an outlet chamber 38 on the other side of the wall 34. A diaphragm valve member 40 extends across the top of the valve lower body portion 32. A valve upper body portion 42 is disposed over the diaphragm valve member 40 and is coupled to or integral with the valve lower body portion 32, forming a top chamber 44 between the diaphragm valve member 40 and the valve upper body portion 42. Although the exemplary embodiment shows a specific type of shut off valve 20, the present invention contemplates using other types of shut off valves 20 that can shut off the supply of fluid.

The diaphragm valve member 40 is movable between an open position (FIG. 1) allowing water to move from the inlet chamber 36 to the outlet chamber 38 and a closed position (FIG. 2) in which the diaphragm valve 40 is seated against the wall 34 and valve lower body portion 32 to prevent water from being supplied from the inlet chamber 36 to the outlet chamber 38. A biasing element 46, such as a stainless steel coil spring, is disposed between the diaphragm valve member 40 and the valve upper body portion 42, for biasing the diaphragm valve member 40 toward a closed position against the top of the valve lower body portion 32 and wall 34. A first bypass check valve 48a is preferably disposed in the wall 34 between the inlet chamber 36 and outlet chamber 38, for equalizing pressure between the inlet chamber 36 and outlet chamber 38, for example, when the pressure in outlet chamber 38 exceeds that in inlet chamber 36 as a result of thermal expansion. A second bypass check valve 48b is disposed in the diaphragm valve member 40, for equalizing the pressure between inlet chamber 36 and top chamber 44, for example, when there is an excessive draw of water from the system inlet 14. The equalization of pressure in chamber 36, and chamber 44 ensures against false shut downs of the shut off valve 20.

According to the preferred embodiment, a supply pressure sensor line 50 is fluidly coupled between the FMD 22 and the supply inlet 14 proximate the inlet chamber 36, for detecting supply pressure. A tank pressure sensor line 52 is fluidly coupled between the FMD 22 and the supply inlet 14 proximate the outlet chamber 38, for detecting tank pressure. A system pressure sensor line 54 is fluidly coupled between the FMD 22 and the system outlet 16, for detecting hot water system pressure. The FMD 22 is also fluidly coupled to the top chamber 44 of the shut off valve 20.

The FMD 22 includes an actuation mechanism 56 that is movable between an opened position and a closed position in response to the pressure sensed in the supply pressure sensor line 50 and tank pressure sensor line 52. The actuation mechanism 56 opens and closes a fluid path between the top chamber 44 of the shut off valve 20 and the system pressure sensor line 54, as indicated by arrows 58.

The actuation mechanism 56 (FIG. 1) is in the opened position when the pressure in the supply sensor line 50 and tank pressure sensor line 52 are substantially equalized. The actuation mechanism 56 of the FMD 22 is normally in the opened position as water is drawn off from a faucet or fixture coupled to the system outlet 16. In the opened position, the FMD 22 allows pressure to be relieved from the top chamber 44 as water passes through the open fluid path into the system pressure sensor line 54. The water in inlet chamber 36 will then overcome the pressure exerted by the biasing element 46 against the diaphragm valve member 40, thereby moving the diaphragm valve member 40 and flowing into the outlet chamber 38 and on to the tank 12. The FMD 22 remains in the opened position as long as the tank pressure sensor line 52 fluidly coupled to the FMD 22 detects pressure in the supply inlet 14 proximate the outlet chamber 38. When the faucet or fixture is turned off and the water is no longer drawn through the system outlet 16, the pressure in the top chamber 44 equalizes, and the biasing element 46 allows the diaphragm valve member 40 to return to its normally closed position.

The actuation mechanism 56 (FIG. 2) moves to the closed position in the direction of arrow 75 when the pressure drops in the tank pressure sensor line 52. When leakage occurs in the tank 12, for example, the pressure in the tank 12 and in the supply inlet 14 proximate the outlet chamber 38 will drop to zero. The pressure in the supply inlet 14 proximate the inlet chamber 36, on the other hand, remains at the supply pressure (e.g. about 5–100 PSI). The tank pressure sensor line 52 and the supply pressure sensor line 54 fluidly coupled to the FMD 22 detect this pressure differential. The pressure differential causes the actuation mechanism 56 of the FMD 22 to unlock and close the fluid path 58 (FIG. 1) between the top chamber 44 and the system pressure sensor line 54. When this fluid path is closed, the pressure within the top chamber 44 is not relieved, and the diaphragm valve member 40 is maintained in a closed position. Thus, when the actuation mechanism 56 of the FMD 22 moves to the closed position, the shut off valve 20 prevents water from being supplied to the tank 12.

Figure 3:
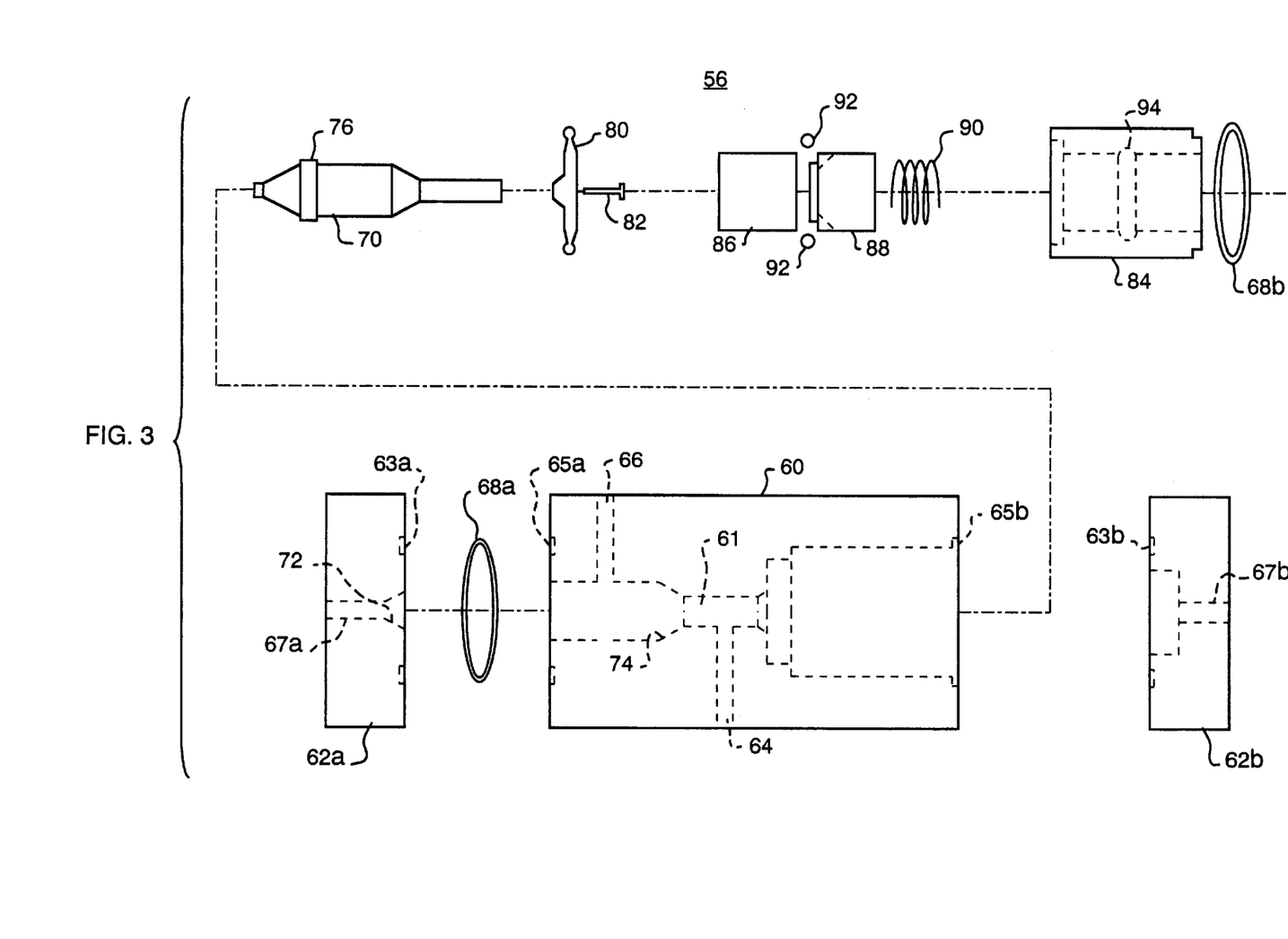
FIG. 3 is an exploded view of a fluid monitoring device, according to one embodiment of the present invention, for use in the fluid supply shut off valve system.

According to one embodiment, the FMD 22, FIG. 3, includes a body portion 60 defining a central passageway 61 that receives the actuation mechanism 56. First and second end caps 62a, 62b are disposed at the ends of the body portion 60 and hold the actuation mechanism 56 within the central passageway 61 of the body portion 60. In one example, the FMD body portion 60 and the first and second end caps 62a, 62b have a generally cylindrical shape. The first end cap 62a has a passageway 67a that fluidly couples the FMD 22 to the supply pressure sensor line 50, and the second end cap 62b has a passageway 67b that fluidly couples the FMD 22 to the tank pressure sensor line 52. One or more sealing members, such as O-rings 68a, 68b, are preferably disposed between the first and second end cap 62a, 62b in respective annular recesses or grooves 63a, 63b and the FMD body portion 60 in respective annular recesses or grooves 65a, 65b to seal the central passageway 61 within the FMD body portion 60.

The body portion 60 of the FMD 22 includes an inlet passageway 64 that fluidly couples the top chamber 44 in the shut-off valve 20 to the central passageway 61 of the FMD body portion 60. The FMD body portion 60 also includes an outlet passageway 66 that fluidly couples the central passageway 61 of the FMD body portion 60 to the system pressure sensor line 54. The inlet passageway 64, central passageway 61 and outlet passageway 66 provide a fluid path through the FMD 22 for relieving pressure from the top chamber 44 of the shut-off valve 20.

The preferred embodiment of the actuation mechanism 56 includes a plunger 70 slidably disposed within the central passageway 61 of the FMD body portion 60. In the open position (FIG. 1), the plunger 70 sits against a first plunger seat 72 disposed in the first end cap 62a, and in a closed position (FIG. 2), the plunger 70 sits against a second plunger seat 74 disposed within the central passageway 61 of the FMD body portion 60. The plunger 70 preferably includes an annular rib 76 that contacts the inner surface of the central passageway 61 within the FMD body portion 60 as the plunger 70 slides within the passageway 61.

The actuation mechanism 56 further includes a diaphragm 80 disposed within the central passageway 61 of the FMD body portion 60, for moving the plunger 70 to the opened or closed position. The diaphragm 80 is attached to the plunger 70, for example, by a screw 82. A diaphragm retainer 84 typically formed as a hollow member is disposed within the FMD body portion 60, for holding the diaphragm 80 in position within the FMD body portion 60. A spacer member or plug 86 and retainer member or plug 88 are slidably disposed within the hollow member or diaphragm retainer 84, for moving the diaphragm 80 against the plunger 70. A biasing element 90, such as a stainless steel coil spring is disposed between the retainer plug 88 and the second end cap 62b, for biasing the retainer plug 88, spacer plug 86, diaphragm 80 and plunger 70 toward the opened position. One or more locking balls 92 are preferably disposed between the spacer plug 86 and the retainer plug 88, for locking with a locking groove 94 within the diaphragm retainer 84 when the actuation mechanism 56 is in the opened position, as will be describe in greater detail below. The diaphragm 80 preferably acts as a seal between the central passageway 61 and the spacer plug 86, retainer plug 88, locking balls 92, and biasing element 90.

Figure 4:
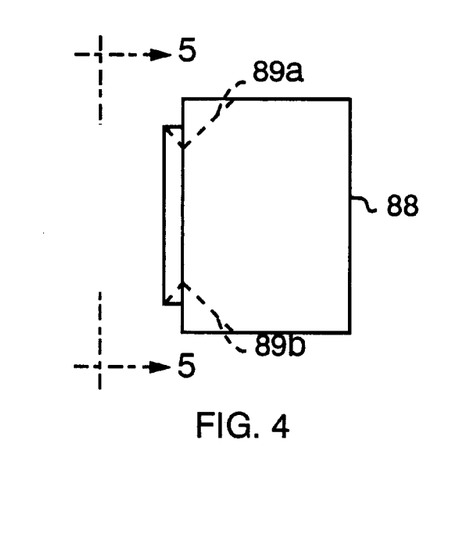
FIG. 4 is a side elevation view of a retainer plug for use in a valve locking mechanism, according to one embodiment of the present invention.
Figure 5:
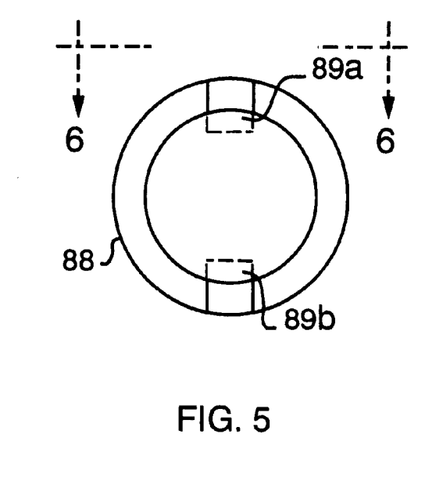
FIG. 5 is a front elevation view of the retainer plug taken along line 5—5 in FIG. 4.
Figure 6:
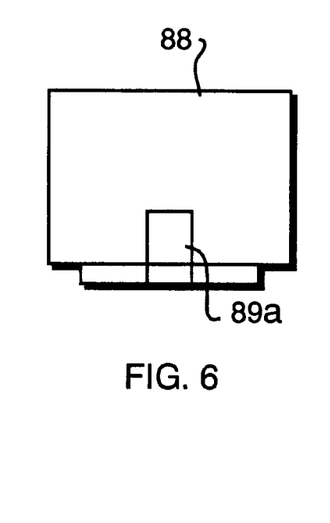
FIG. 6 is a plan view of the retainer plug taken along line 6—6 in FIG. 5.

The preferred embodiment of the retainer plug 88, FIGS. 4–6, includes one or more tapered surface 89a, 89b, for forcing and retaining the locking balls 92 into the locking groove 94 within the internal surface of the hollow member 84. In the exemplary embodiment, the tapered surfaces 89a, 89b are formed within grooves at one end of the retainer plug 88. The hollow member 84, spacer plug 86, retainer plug 88, and locking ball(s) 92 together form a locking mechanism that can be used with other valve-type mechanisms to prevent accidental deactivation of the valve-type mechanism.

Although the exemplary embodiment shows a specific type of actuation mechanism 56 within the FMD 22, the present invention contemplates any type of actuation mechanism capable of normal operation in the standard hot water draw off mode and for maintaining the pressure in the top chamber 44 of the shut off valve 20 in response to a drop in pressure in the tank pressure sensor line 52 in the failure mode. Although specific dimensions and shapes are shown for the plunger 70, diaphragm 80, spacer plug 86, retainer plug 88, locking balls 92, and biasing element 90, the present invention contemplates various designs for these elements. The hollow member 84, spacer plug 86, and retainer plug 88, for example, can have a shape other than a generally cylindrical shape. The locking ball(s) 92 can also have a rounded shape other than a generally spherical shape. Also, the spacer plug 86 and retainer plug 88 can be formed as one piece.

In use, when the FMD 22 is in the normal opened position (FIG. 1), the biasing element 90 moves the retainer plug 88, spacer plug 86, diaphragm 80 and plunger 70 to open the flow path between the inlet passageway 64, the central passageway 61 and the outlet passageway 66, as indicated by arrows 58. In this open position, the locking balls 92 are received within the locking groove 94 of the diaphragm retainer 84 and retained within the locking groove 94 by the tapered surfaces 89a, 89b of the retainer plug 88, thereby locking the spacer plug 86 into position and maintaining the FMD 22 in an open position.

When the pressure in the tank pressure sensor line 52 drops (e.g. to ambient pressure), the pressure in the supply pressure sensor line 50 applies a force to the plunger 72. If the force is sufficient to cause the spacer plug 86 to dislodge the locking balls 92 out of engagement with the locking groove 94, the retainer plug 88 will move against the biasing element 90, allowing the plunger 70 to move to the closed position. The plunger 70 then sits against the second plunger seat 74, stopping the flow between the inlet passageway 64 and the outlet passageway 66. Although the FMD 22 in the exemplary embodiment responds to a tank pressure drop to about ambient pressure, the present invention contemplates a FMD 22 that can detect and respond to other pressure ranges in the supply inlet and tank.

Figure 7:
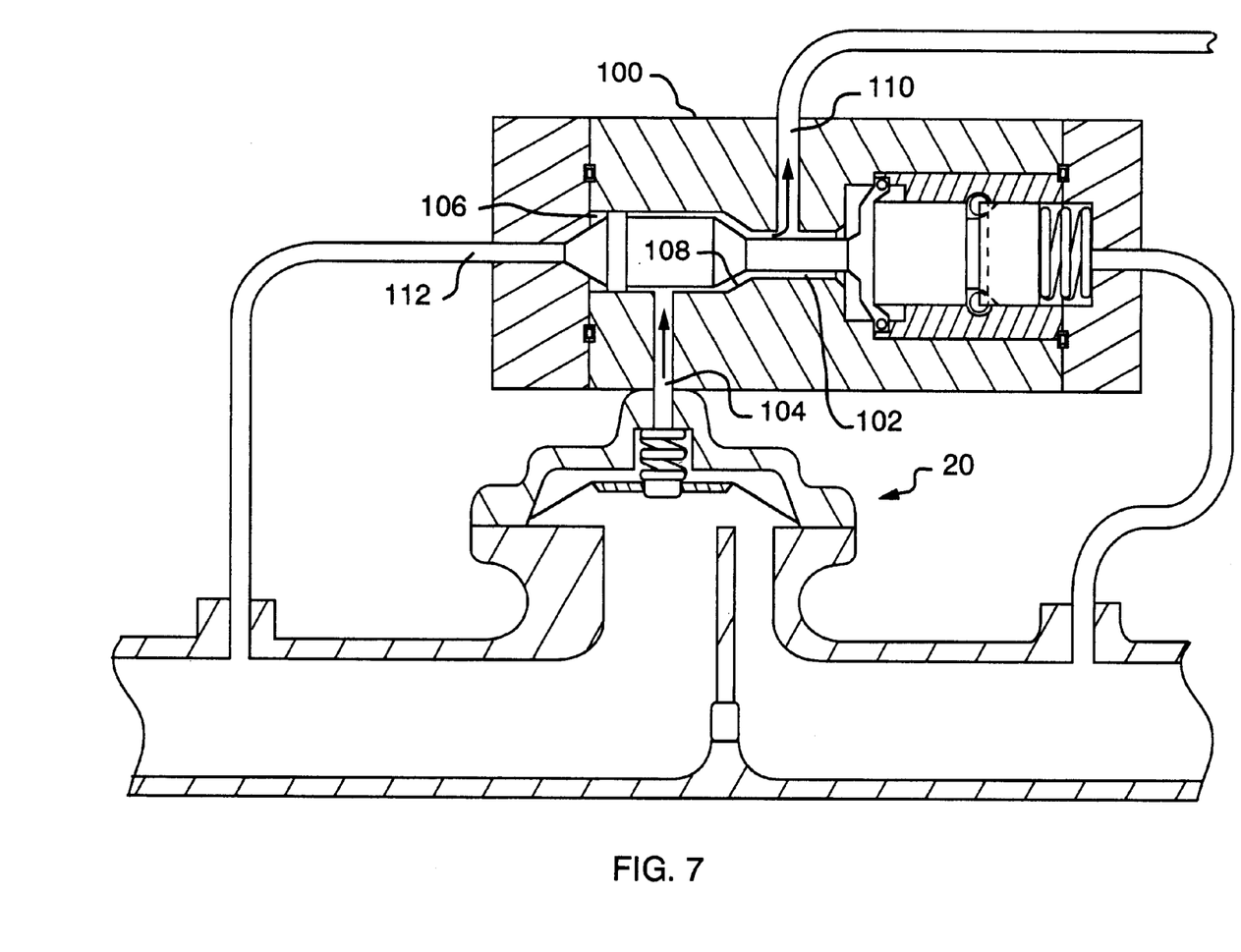
FIGS. 7 and 8 are partial cross-sectional views of the FMD, according to an alternative preferred embodiment of the present invention, in respective opened and closed positions.
Figure 8:
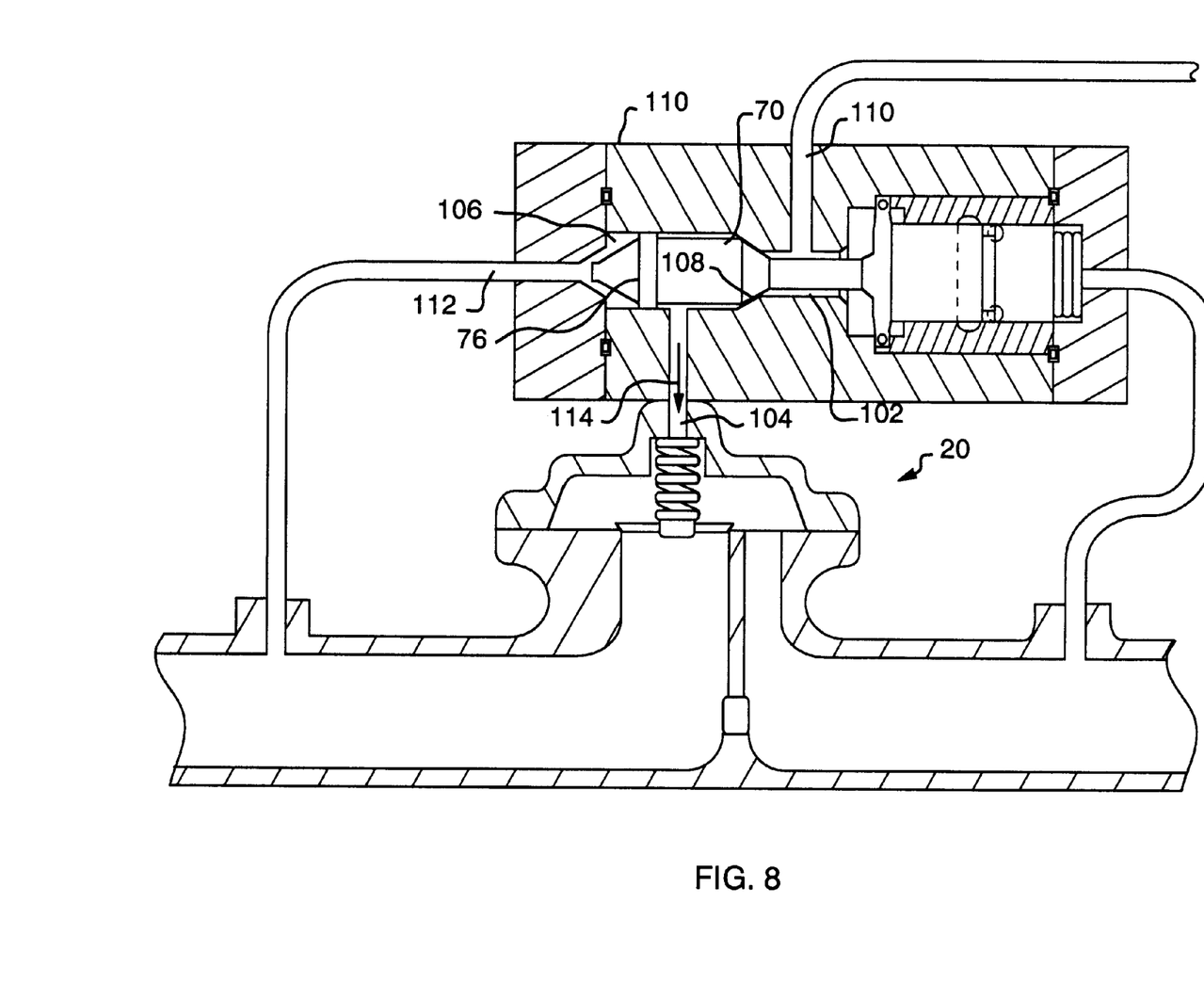

According to an alternative preferred embodiment, an FMD body portion 100, FIGS. 7 and 8, includes a central passageway 102 extending through the body portion 100. An inlet passageway 104 is positioned in the body portion 100 closer to an end 106 of the central passageway 102 and on one side of a plunger seat 108 and an outlet passageway 110 is positioned in the body portion 100 on the other side of the plunger seat 108. By positioning the inlet passageway 104 on the "supply side" of the plunger seat 108, water from the "supply side" will go to the diaphragm valve 20 through the inlet passageway as indicated by arrow 114 when the plunger 70 is in the closed position seated against plunger seat 108 (FIG. 8). Any water from the supply pressure line 112 that leaks around the annular rib 76 of the plunger 70, for example, will assure that pressure is on the diaphragm valve 20 and help maintain the diaphragm valve 20 in the closed position. The present invention also contemplates other designs for the FMD body portion and passageways therein.

Figure 9:
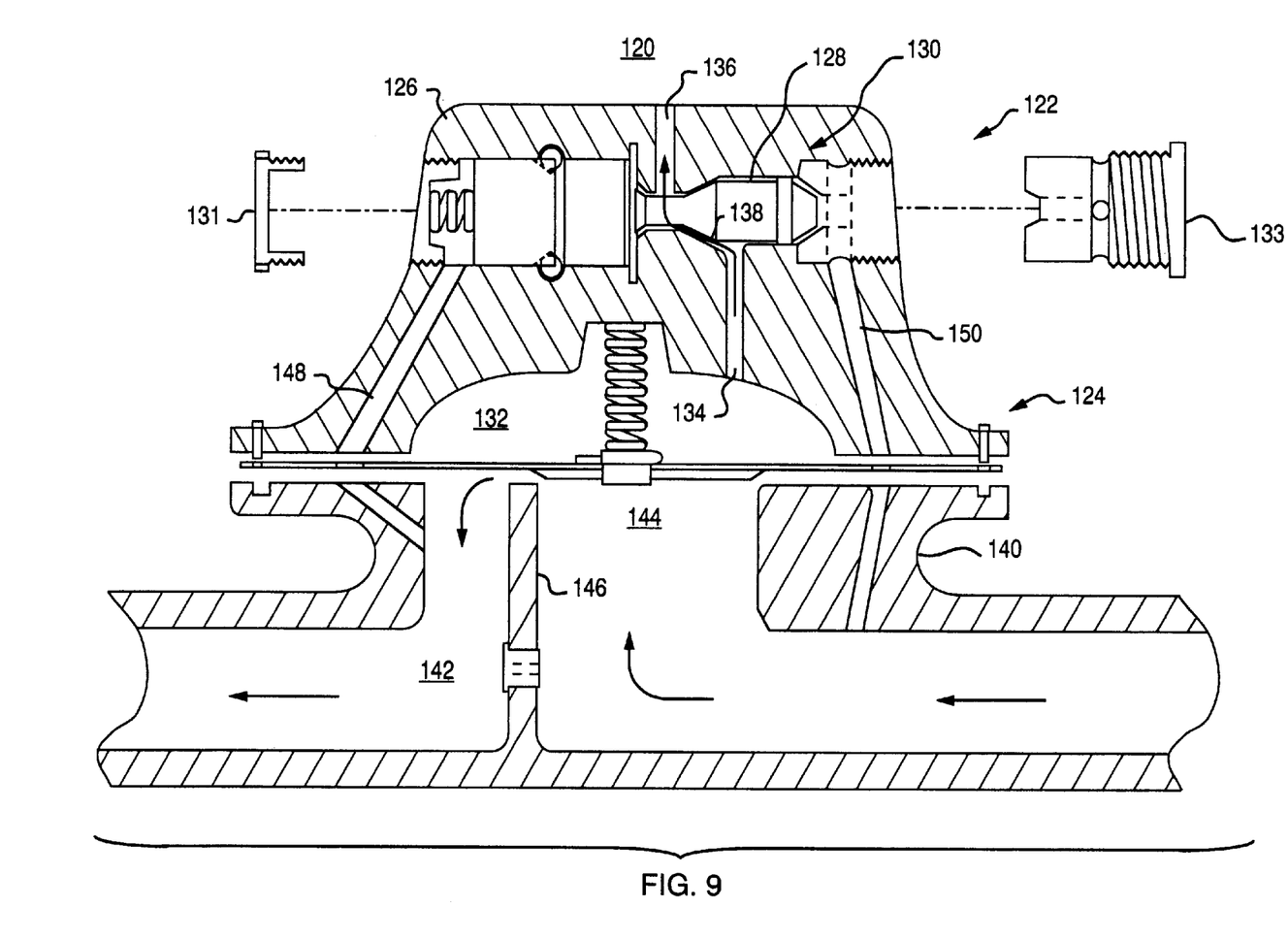
FIG. 9 is a partial cross-sectional view of the fluid supply shut off valve system, according to another embodiment of the present invention.
Figure 10:
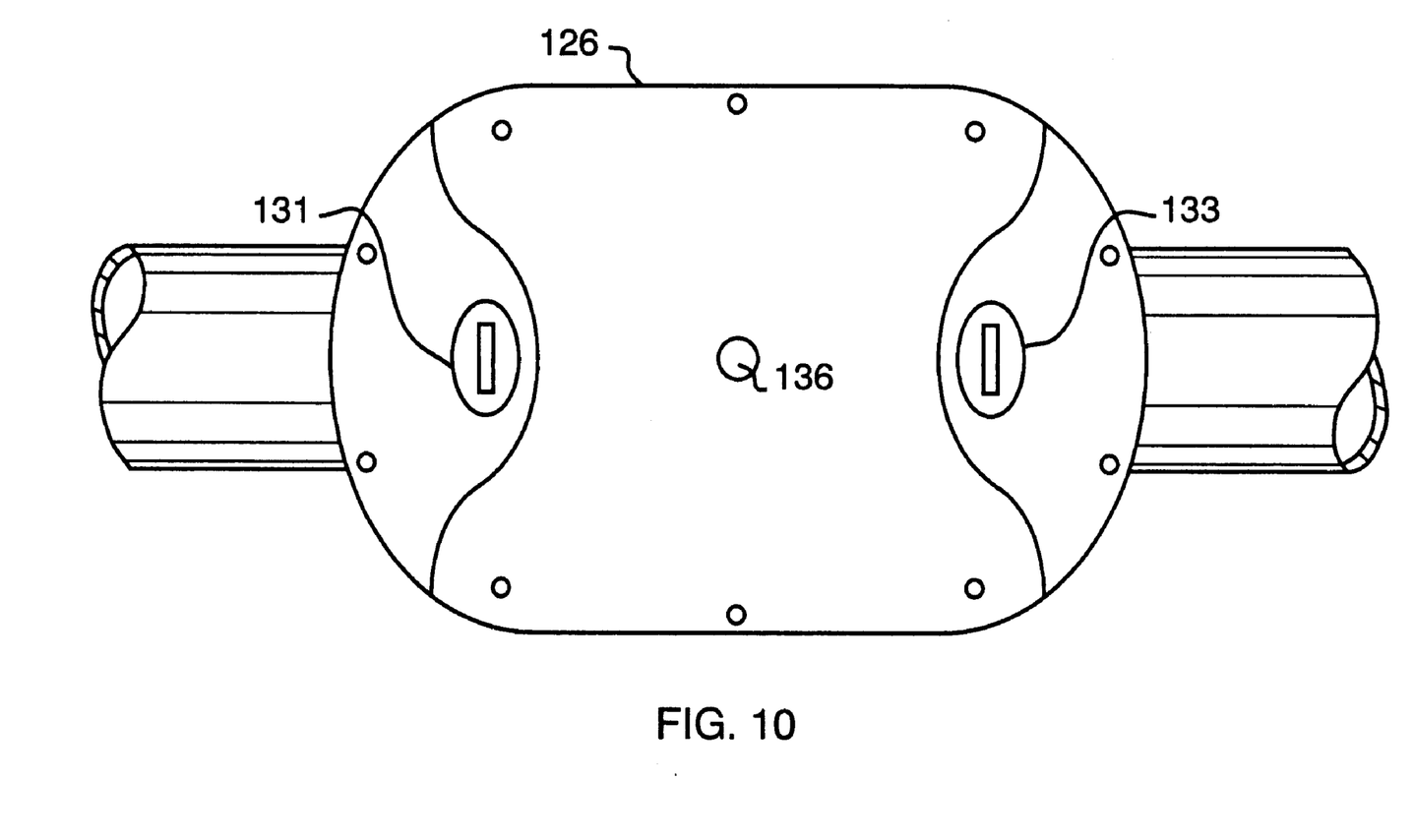
FIG. 10 is a top view of the fluid supply shut off valve system shown in FIG. 9.

According to another alternative, a fluid supply shut off valve system 120, FIGS. 9 and 10, according to the present invention, includes the FMD 122 and valve 124 combined or encapsulated. The combined or encapsulated valve system 120 includes an upper body portion or cap 126 having a central passageway 128 for receiving an actuation/locking mechanism 130 similar to that described above. First and second caps 131, 133 are secured in respective ends of the central passageway 128 to seal the central passageway 128 and secure the actuation/locking mechanism 130 therein. A top valve chamber 132 is also disposed in the upper body portion 126 with an inlet passageway 134 leading from the top valve chamber 132 to the central passageway 128. An outlet passageway 136 extends in the upper body portion 126 from the central passageway 128 to a system outlet (not shown) such that pressure is relieved from the top valve chamber 132 when a fluid path 138 is opened by the actuation mechanism 130, as described above.

The upper body portion 126 is secured to a lower body portion 140 extending from the supply line. The lower body portion 140 defines an inlet chamber 142 and an outlet chamber 144 on respective sides of a wall 146 within the supply line. A supply pressure sensor line 148 extends through the upper body portion 126 and lower body portion 140 to the inlet chamber 142, for sensing the supply pressure. A tank pressure sensor line 150 extends through the upper body portion 126 and lower body portion 140 to the outlet chamber 144, for sensing the tank pressure. The shut off valve system 120, according to this embodiment, generally operates in a manner similar to the embodiment described above. The present invention also contemplates other similar designs for the shut off valve system. The FMD and valve according to the present invention can be made of plastic or any other suitable material.

Accordingly, the fluid supply shut off valve system of the present invention allows the automatic shut off of fluid supply to a storage tank in response to a drop in pressure caused by leakage in the storage tank. The fluid supply shut off valve system of the present invention ensures against false shut downs caused by other types of pressure fluctuations within the system.

Modifications and substitutions by one of ordinary skill in the art are considered to be within the scope of the present invention which is not to be limited except by the claims which follow.

What is claimed is:

1. A fluid supply shut off valve system, for use with a fluid storage tank fluidly coupled to a supply inlet, for supplying fluid to the fluid storage tank, and fluidly coupled to a system outlet, for drawing fluid from the fluid storage tank, said system comprising:

a shut off valve coupled to said supply inlet, for controlling the supply of fluid through said supply inlet to said storage tank, wherein said shut off valve is in a normally closed position, and wherein said shut valve opens to supply fluid to said storage tank as fluid is drawn through said system outlet; and     a fluid monitoring device fluidly coupled to said supply inlet on both sides of said shut off valve, for monitoring a pressure differential between storage tank pressure in said storage tank and supply pressure in said supply inlet, and fluidly coupled to said shut off valve and to said system outlet, for opening and closing a fluid path between said shut off valve and said system outlet, wherein said fluid monitoring device is normally open when said storage tank pressure and said supply pressure are generally equalized, wherein said fluid monitoring device is closed automatically when said storage tank pressure drops to a predetermined pressure, and wherein said fluid path relieves pressure from said shut off valve allowing said shut off valve to open when said fluid monitoring device is opened and causing said shut off valve to remain closed when said fluid monitoring device is closed.

2. The system of claim 1 wherein said shut off valve includes a diaphragm valve member in a normally closed position.

3. The system of claim 2 wherein said shut off valve includes an inlet chamber and an outlet chamber fluidly coupled to said supply inlet, wherein said diaphragm valve member prevents flow of fluid from said inlet chamber to said outlet chamber when disposed in said normally closed position, and wherein said diaphragm valve allows fluid to flow from said inlet chamber to said outlet chamber when said diaphragm valve is in an open position.

4. The system of claim 3 further including a by-pass check valve disposed between said inlet chamber and said outlet chamber of said shut-off valve.

5. The system of claim 3 wherein said diaphragm valve member forms a pressure chamber on a side of said diaphragm valve member opposite said inlet chamber and said outlet chamber, and wherein said fluid monitoring device is fluidly coupled to said pressure chamber for relieving pressure from said pressure chamber and allowing said diaphragm valve member to move to said open position.

6. The system of claim 5 further including a by-pass check valve disposed in said diaphragm valve member between said pressure chamber and said inlet chamber.

7. The system of claim 5 wherein said fluid monitoring device includes an actuation mechanism, responsive to said pressure in said storage tank, for preventing pressure relief from said pressure chamber in said shut off valve when said pressure in said storage tank drops to said predetermined pressure, thereby preventing said diaphragm valve member from moving to said open position.

8. The system of claim 7 further including:
a tank pressure sensor line fluidly coupled between said fluid monitoring device and said supply inlet proximate said outlet chamber of said shut off valve, for detecting said pressure in said storage tank;
a supply pressure sensor line fluidly coupled between said fluid monitoring device and said supply inlet proximate said inlet chamber of said shut off valve, for detecting supply pressure in said supply inlet; and
wherein said actuation mechanism is responsive to a pressure differential between said tank pressure sensor line and said supply pressure sensor line.

9. The system of claim 8 further including a system pressure sensor line fluidly coupled between said fluid monitoring device and said system outlet, and wherein said actuation mechanism, in response to said pressure differential, opens and closes said fluid path between said pressure chamber in said shut off valve and said system pressure sensor line.

10. The system of claim 9 wherein said fluid monitoring device includes a body portion having a central passageway, an inlet passageway extending from said pressure chamber in said diaphragm valve to said central passageway, and an outlet passageway extending from said central passageway to said system pressure sensor line, wherein said actuation mechanism is disposed within said central passageway to open and close a fluid path through said central passageway, and wherein pressure is relieved from said pressure chamber when said fluid path is opened.

11. The system of claim 10 wherein said inlet passageway is disposed in said body portion proximate an end of said central passageway coupled to said supply pressure sensor line such that fluid from said supply pressure sensor line enters said pressure chamber in said diaphragm valve through said inlet passageway to maintain pressure on said diaphragm valve when said actuation mechanism is in a closed position.

12. The system of claim 9 including an upper body portion and a lower body portion extending from said supply inlet;
wherein said upper body portion includes said pressure chamber, a central passageway, an inlet passageway extending from said pressure chamber to said central passageway, and an outlet passageway extending from said central passageway to said system pressure sensor line;
wherein said lower body portion includes said inlet chamber and said outlet chamber;
wherein said diaphragm valve member is disposed between said upper body portion and said lower body portion between said pressure chamber and said inlet and outlet chambers;
wherein said supply pressure sensor line extends through said upper body portion and said lower body portion to said inlet chamber and said tank pressure sensor line extends through said upper body portion and said lower body portion to said outlet chamber;
wherein said actuation mechanism is disposed within said central passageway to open and close a fluid path through said central passageway such that pressure is relieved from said pressure chamber through said inlet passageway, said central passageway and said outlet passageway when said fluid path is opened.

13. A fluid monitoring device, for use with a shut off valve that opens to supply fluid through a supply inlet to a storage tank in a fluid supply and delivering system, said fluid monitoring device comprising:
a body portion including a central passageway, an inlet passageway, for fluidly coupling said central passageway to said shut off valve, and an outlet passageway, for fluidly coupling said central passageway to a system outlet;
a supply pressure sensor line fluidly coupled to said body portion, for detecting a supply pressure in said supply inlet;
a tank pressure sensor line fluidly coupled to said body portion, for detecting a tank pressure in said storage tank; and
an actuation mechanism disposed within said central passageway and responsive to said supply pressure detected by said supply pressure sensor line and said tank pressure detected by said tank pressure sensor line, for preventing said shut off valve from opening and supplying fluid to the fluid storage tank in response to a predetermined pressure differential, wherein said actuation mechanism opens and closes a fluid path through said inlet passageway, said central passageway, and said outlet passageway, and wherein said fluid path relieves pressure from said shut off valve allowing said shut off valve to open when said actuation mechanism is in an open position and preventing said shut off valve from opening when said actuation mechanism is in a closed position.

14. The fluid monitoring device of claim 13 wherein said inlet passageway is disposed in said body portion proximate an end of said central passageway coupled to said supply pressure sensor line such that fluid from said supply pressure sensor line enters said pressure chamber in said shut off valve through said inlet passageway to maintain pressure on said shut off valve when said actuation mechanism is in a closed position.

15. The fluid monitoring device of claim 13 wherein said actuation mechanism includes:
   a plunger slidably disposed in said central passageway, for opening and closing said fluid path through said central passageway; and
   a biasing element, for biasing said plunger toward an open position in which said fluid path through said central passageway is open.

16. The fluid monitoring device of claim 15 wherein said actuation mechanism further includes:
   a diaphragm disposed within said central passageway generally abutting said plunger; and
   a locking mechanism disposed within said central passageway of said body portion generally between said diaphragm and said biasing element, for causing said diaphragm to move said plunger toward said open position and for locking said plunger in said open position.

17. The fluid monitoring device of claim 16 wherein said locking mechanism includes:
   a hollow member disposed within said central passageway of said body portion, for retaining said diaphragm within said central passageway of said body portion, wherein said hollow member includes a locking groove disposed within at least a portion of an internal surface of said hollow member;
   a spacer plug slidably disposed within said hollow member against said diaphragm, wherein said spacer plug moves said diaphragm against said plunger;
   a retainer plug slidably disposed within said hollow member between said spacer plug and said biasing element, wherein said biasing element moves said retainer plug proximate said spacer plug; and
   at least one locking ball disposed generally between said retainer plug and said spacer plug, wherein said retainer plug moves and retains said at least one locking ball in said locking groove within said hollow member such that said plunger is locked in said open position, wherein a force on said plunger caused by said pressure differential between said tank pressure sensor line and said supply pressure sensor line causes said spacer plug to move said locking balls out of said locking groove.

18. A locking mechanism for preventing false shut downs of valve systems, said locking mechanism comprising:
   a hollow member having an internal surface and at least one locking groove disposed within at least a portion of said internal surface, wherein said hollow member is positioned adjacent a passageway in said valve system;
   a spacer plug slidably disposed within said hollow member, for sliding in a first direction;
   a retainer plug slidably disposed within said hollow member proximate said spacer plug, wherein said retainer plug moves independently of said spacer plug;
   at least one locking ball disposed between said spacer plug and said retainer plug, wherein said retainer plug moves and retains said at least one locking ball in said at least one locking groove within said internal surface of said hollow member, for locking said spacer plug in a first position, wherein a predetermined force against said spacer plug will cause said spacer plug to move said at least one locking ball out of said at least one locking groove; and
   a diaphragm secured against one end of said hollow member and positioned against said spacer plugs, for movement with said spacer plug, and for acting as a seal between said passageway in said valve system and said spacer plug, said retainer plug, and said locking balls.

19. The locking mechanism of claim 18, wherein said retainer plug includes a tapered surface at one end of said retainer plug, for forcing said at least one locking ball into said at least one locking groove.

20. The locking mechanism of claim 19 wherein said retainer plug includes at least one groove within said one end of said retainer plug, said at least one groove includes said tapered surface and receives said at least one locking ball.

21. The system of claim 1, wherein said fluid monitoring device is closed automatically and locked when said storage tank pressure drops to said predetermined pressure.

22. A fluid monitoring device, for use with a shut off valve that opens to supply fluid through a supply inlet to a storage tank in a fluid supply and delivering system, said fluid monitoring device comprising:
   a body portion including a central passageway, an inlet passageway, for fluidly coupling said central passageway to said shut off valve, and an outlet passageway, for fluidly coupling said central passageway to a system outlet;
   a supply pressure sensor line fluidly coupled to said body portion, for detecting a supply pressure in said supply inlet;
   a tank pressure sensor line fluidly coupled to said body portion, for detecting a tank pressure in said storage tank;
   an actuation mechanism disposed within said central passageway and responsive to said supply pressure detected by said supply pressure sensor line and said tank pressure detected by said tank pressure sensor line, for preventing said shut off valve from opening and supplying fluid to the fluid storage tank in response to a predetermined pressure differential, wherein said actuation mechanism includes:
   a plunger slidably disposed in said central passageway, for opening and closing said fluid path through said inlet passageway, said central passageway, and said outlet passageway, and wherein said fluid path relieves pressure from said shut off valve allowing said shut off valve to open when said plunger is in an open position and preventing said shut off valve from opening when said plunger is in a closed position;
   a biasing element, for biasing said plunger toward an open position in which said fluid path through said central passageway is open; and
   a diaphragm disposed within said central passageway generally abutting said plunger; and
   a locking mechanism disposed within said central passageway of said body portion generally between said diaphragm and said biasing element, wherein said locking mechanism includes:
   a hollow member disposed within said central passageway of said body portion, for retaining said diaphragm within said central passageway of said body portion, wherein said hollow member includes a locking groove disposed within at least a portion of an internal surface of said hollow member;
   a spacer plug slidably disposed within said hollow member against said diaphragm, wherein said spacer plug moves said diaphragm against said plunger;

a retainer plug slidably disposed within said hollow member between said spacer plug and said biasing element, wherein said biasing element moves said retainer plug proximate said spacer plug; and at least one locking ball disposed generally between said retainer plug and said spacer plug, wherein said retainer plug moves and retains said at least one locking ball in said locking groove within said hollow member such that said plunger is locked in said open position, wherein a force on said plunger caused by said pressure differential between said tank pressure sensor line and said supply pressure sensor line causes said spacer plug to move said locking balls out of said locking groove.

* * * * *